3,231,411
PRIMER COMPOSITION FOR COATING POLY-
ETHYLENE SUBSTRATES AND THE RESULTING
PRODUCTS
Richard B. Tyler, Roxbury, James C. Donald, Acton
Center, and Alexander A. Nichipor, Lexington, Mass.,
assignors to W. R. Grace & Co., Cambridge, Mass., a
corporation of Connecticut
Filed Apr. 23, 1962, Ser. No. 189,346
11 Claims. (Cl. 117—76)

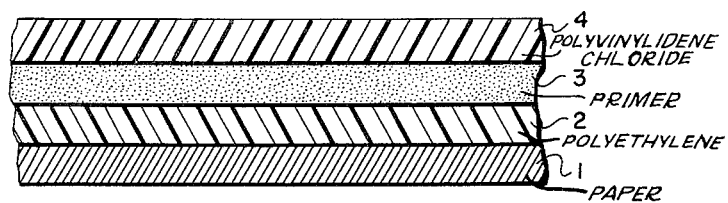

This invention relates to coated polyethylene. In a particular aspect, it relates to a composition suitable for use as a primer for securing adhesion of polyvinylidene chloride to polyethylene substrates, and the resulting coated product.

Polyethylene has found wide commerical acceptance because of its good chemical resistance, lack of odor and toxicity, electrical properties and light weight. Films made from polyethylene are in wide use because of its low water-vapor permeability. On the other hand, polyethylene has a high permeability to organic vapors and to oxygen and other gases, and this factor has precluded its use in a number of applications where resistance to such permeation is required. For example, the diffusion of oxygen into a sealed polyethylene package containing oil and/or fat-bearing foods causes rancidity and other undesirable chemical changes. Also, when packaged foods are stored near odoriferous products, such as soap, the soap vapors diffuse into the package and impair the flavor, taste and odor of the food.

It has been proposed to render polyethylene films impervious to organic vapors and oxygen by coating such films with vinylidene chloride resins. These films are non-toxic, odorless and have an inherent impermeability to oxygen unmatched by any other known commercial plastic materials. Such coated films, however, have not proved completely advantageous because known adhesives for polyethylene and emulsion systems of vinylidene chloride resins are not entriely satisfactory. As a consequence, the resin peels badly or the resin and film separate completely.

It is, therefore, an object of this invention to provide polyethylene substrates coated with polyvinylidene chloride. The substrates may consist of polyethylene per se or a base structure comprising a polyethylene film composited with a paper product. This object is achieved by providing a primer composition by which the polyvinylidene chloride and polyethylene are strongly and permanently bonded together. As a result, the polyvinylidene chloride incorporates in the polyethylene the attribute of improved impermeability without impairing the clarity and/or flexibility of the polyethylene film. The coated substrates exhibit a high degree of impermeability not only to moisture but to organic vapors and oxygen as well.

A cross-section of the coated polyethylene product is shown in the single figure of the drawing in which the numeral 1 represents a base, such as kraft paper, 2 represents a polyethylene sheet having a modified surface, 3 represents the dried primer composition, and 4 is the film of polyvinylidene chloride derived from an emulsion system.

The primer composition is comprised of (1) a polymer latex comprising a major portion of polyvinylidene chloride, (2) stabilized colloidal silica, and (3) a modified rosin. The primer seals the pores of the polyethylene film and primes it with a surface of a comparatively uniform coating that promotes adhesion with the polyvinylidene chloride. An impenetrable finish is thus provided to the film so that containers, such as cartons or bags, prepared from the coated film and endowed with an effective barrier against the transmission of air and vapors therethrough.

The polyvinylidene chloride which is useful as a component of the adhesive composition as well as the coating for the polyethylene is applied as a latex. These colloidal despersions contain about 50 percent to 70 percent solids, the average particle size of which ranges between 1800 to 2400 A. as determined by electron microscopy. The viscosity is in the range of 20 to 40 centipoises at 25° C. (Brookfield #1 Spindle, 60 r.p.m.) at 60 percent solids by weight.

The latex is a polymer composed of at least 70 percent by weight of vinylidene chloride copolymerized with other polymerizable monomers to suppliment the inherent properties of the vinylidene chloride. Monomers that can be copolymerized with vinylidene chloride to improve the flexibility of the resin are vinyl esters, alkyl vinyl ethers, acrylate and methacrylate esters. Such monomers are usually used in the amounts of 5 to 30 percent by weight of the total resin. Additional monomers that can be used to improve other properties, such as latex film consolidation, adhesiveness and toughness, are acrylic acid, itaconic acid, aconitic acid, acrylonitrile and methacrylonitrile. These monomers are ususally used in amounts ranging between about 1 to 10 percent by weight of the total resin. As used herein, the term "polyvinylidene chloride" is intended to cover polymers composed of a predominant amount, i.e. of the order of 70 to 95 percent of vinylidene chloride monomer copolymerized with 5 to 30 percent of other polymerizable monomers.

The stabilized colloidal silica is an aqueous sol containing approximately 15 to 30 percent $SiO_2$ which is stabilized against gelation by the adition of less than about 0.5 percent $Na_2O$. The sol improves the bond strength and the water and heat resistance of the adhesive coating. An effective collodial silica is one available commercially under the trademark Ludox AM. Its physical properties and approximate chemical composition are as follows:

Appearance _____ Opalescent liquid.
$SiO_2$ _____ 30.0 percent.
$Al_2O_3$ _____ 0.2 percent.
$Na_2O$ _____ 0.13 percent.
$SO_4$ as $Na_2SO_4$ _____ 0.006 percent.
Cl as NaCl _____ 0.007 percent.
pH at 25° C. _____ 8.9–9.1.
Viscosity at 25° C. _____ 5–10 c.p.s.
Approximate particle diameter ___ 15 mu.
Approximate surface area _____ 210 $M^2/g.SiO_2$.
Freezing point _____ 0° C.

It is noted that this composition includes a small amount of aluminia, and is preferred. This alumina is chemically bound with the silica. However, sols which are devoid of alumina may also be employed but the primer compositions containing such unmodified sols (i.e. absence of alumina) must be used within 4 to 6 hours as such compositions tend to gel within this period.

The modified rosin improves the wetting and penetrating properties, bond strength, and accelerates tack development of the primer composition. Suitable compounds are those available commercially under the trademark "Dresinol." The "Dresinols" are composed of about 40 to 45 percent of modified rosin and special resins dispersed in sodium hydroxide or ammonium hydroxide. The ammoniacal dispersions are quite effective as no fixed alkali is present. Films laid down containing such dispersions are not redispersible in water after the volatile alkali is removed by evaporation with the water at temperatures of 120 to 180° C. This treatment greatly improves water resistance of films. Another advantage is that ammonium resinate, being extremely tacky, imparts rapid initial wet tack upon application. A particularly effective composition is Dresinol 215 which consists of about 45 percent rosin-derived resin dispersed in ammonium hydroxide.

The primer composition is formulated as a homogeneous mixture to give a total solids content of between about 10 percent to 50 percent, dry weight, dispersed in a liquid, such as water. The solids are composed of about 10 percent to 65 percent polyvinylidene chloride; the colloidal silica, between about 10 percent to 50 percent; and the modified rosin, between about 15 percent to 80 percent by weight. At concentrations in excess of 40 percent modified rosin, the primer compositions are highly tacky and difficult to manipulate. As hereinbefore stated, the term "polyvinylidene chloride" may include monomers other than vinylidene chloride and, accordingly, the percent solids of polyvinylidene chloride stated here includes such monomers.

The manner in which the primer composition is prepared or the order in which the constituents are mixed with each other is not significant. The important criterion is that mixing be thorough to form a homogeneous dispersion. For example, all constitutents may be charged to the mixer in toto, or they may be added incrementally without any set order of addition. However, care must be exercised to prevent metallic contamination. Materials which should be especially avoided are iron, mild steel, zinc, aluminum, copper, and to a lesser extent, brass or bronze. Contact with type 316 stainless steel, chromium, Teflon, polyethylene, glass and certain resin coatings (e.g., epoxy resin varnishes) produces no adverse effects. Mixing may be carried out at room temperature and atmospheric pressure.

When thoroughly mixed, the resulting primer composition is generally egg shell in color, which gradually darkens over a period of about two months. Its viscosity is dependent upon the solids content. The highest viscosity obtainable at room temperature is about 100 centipoises at 40 percent solids with a minimum of about 10 centipoises at 15 percent solids.

Examples I to V illustrate representative primer compositions:

| Example number | Total solids in primer composition percent by weight | Weight of component in composition, grams | | | Percent weight of total solids in composition | | |
|---|---|---|---|---|---|---|---|
| | | Dresinol 215 | Colloidal silica (Ludox AM) | Polyvinylidene chloride latex | Dresinol 215 | Colloidal silica (Ludox AM) | Polyvinylidene chloride latex |
| I | 37.2 | 16 | 36 | 32 | 19.35 | 29 | 51.6 |
| II | 47.5 | 45 | 67 | 100 | 20 | 20 | 60 |
| III | 38.2 | 32 | 100 | 25 | 25 | 50 | 25 |
| IV | 44.5 | 178 | 30 | 17 | 80 | 10 | 10 |
| V | 46.5 | 78 | 50 | 83 | 35 | 15 | 50 |

The operative polyethylene substrates include polyethylene films per se and polyethylene films composited with a paper product, such as kraft paper and boxboard. These composites are prepared by methods which are well known, such as extrusion of the film onto the paper. The thickness of the substrate varies over a wide range and its selection will be dictated by the end use to which the coated article will be put.

Polyethylene is normally a non-adherent material and in order to promote adhesion thereto its surface must be modified. Surface modification may be effected by subjecting the polyethylene film to a variety of influences, such as elastrostatic discharge, contact with an oxidizing flame, exposure to ultra violet light, and subjecting the film to a matted roller to provide a mattee finish. The overall effect of surface treatment is to increase surface polarity which is a prerequisite for good adhesion. Accordingly, as used herein, "modified polyethylene" is intended to cover such films having their surfaces conditioned to enhance adhesion irrespective of the method employed.

The method or means of depositing a coating of the primer composition on the modified polyethylene substrate is not critical. Any type of coating mechanism or device which is capable of depositing a uniform amount in the desired thickness to the substrate may be employed. Special types which may be used include air knife coater, horizontal and vertical size presses, trailing blade, transfer roll, reverse roll, roller coater, gravure, bead coat, metering bar, spray coater and curtain coater. Deposition may be carried out in one or a number of applications and the amount deposited is such as to provide a film thickness ranging between about .002 to .06 mil (dry basis). Thicknesses greater than .06 mil do not provide improved adhesion and any amounts in excess of that are merely wasteful.

The primer-coated substrate is then dried either in air or a suitable drying apparatus. Air-drying can be accomplished in less than one minute while oven-drying can be effected within 4 to 10 seconds at 35 to 105° C. The dried primer film is odorless, clear and flexible, and exhibits no separation between it and the substrate. The degree of adhesion is measured by the pressure-sensitive tape test in which a strip of tape is applied with the fingers to the dried primed substrate and then rapidly pulled off. When subjected to this test, the primer remains intact, indicating excellent adhesive properties.

The polyvinylidene chloride latices which are used to provide high barrier characteristics to the polyethylene substrate are capable of forming clear, continuous films at room temperature without the aid of a plasticizing additive. They are odor-free emulsion polymers having a high vinylidene chloride content and a high total solids, and are internally plasticized by copolymerization. The exceptionally high barrier characteristics are due to the high vinylidene chloride content. Typical properties of a suitable latex are set out in Example VI.

*Example VI*

| | |
|---|---|
| Total solids | 60–62 percent. |
| Viscosity at 25° C. | 25 c.p.s. |
| pH | 4.5–5.0. |
| Color | White-cream. |
| Particle size | 0.25 m. (approx.). |
| Weight per gallon | 11.5 lbs. |
| Mechanical stability | Excellent. |
| Storage stability | Excellent. |
| Chemical stability | Unstable to divalent or trivalent ions. |

The same methods and mechanisms employed to deposit the primer composition onto the subtrate may be used to apply the latex to the primed substrate. And the same care must be exercised to avoid metallic contamination. When using stainless steel equipment, it is desirable to mask or line some of the equipment upon which dried films of the polymer may be deposited during the coating operation. Teflon film is suitable for this purpose as this material inhibits adhesion between it and dried vinylidene chloride polymer films.

Some coating methods may require an increase in the viscosity of the latex. In such case, the viscosity change may be brought about by the addition of suitable thickening agents, such as sodium alginate, karaya gum, hydroxyethyl cellulose and polyvinyl alcohol. The latter also serves as a latex stabilizing agent. Best results are obtained by adding a small amount of latex to the thickener solution, stirring until homogeneous, then adding additional latex with continuous agitation until the desired viscosity is obtained.

Coating thickness may vary and depends upon the end use to which the article is put. Coatings which give a dried film thickness ranging from .02 to 1 mil have been found satisfactory for a myriad of uses. The desired thickness may be effected in one or more passes. To obtain film thicknesses exceeding about .45 mil, greater care is required in drying the coating than with lighter applications in order to prevent skin formation on the top surface of the film which will result in a cracked film. Coatings may be applied at speeds up to 2000 feet per minute of substrate.

Although film formation of the latex will take place by drying for about 2½ minutes at room temperature, true coalescence requires somewhat higher temperatures. Excellent films are obtained by drying at about 105° C. for about 10 seconds. It has been discovered that although a somewhat more flexible film may be obtained by a lower temperature cycle, the physical properties of the lower temperature film will gradually undergo a change over a period of about 2 to 3 weeks until the properties are comparable to those produced by the higher temperature drying cycle. Significant changes in physical characteristics of the films produced at the higher drying temperature have not been observed over a period of time extending beyond 9 months. It has been found, however, that if excessive drying temperatures are employed, film discoloration may occur and, in some cases, blistering of the coating has been observed.

Example VII describes one method for coating polyethylene substrates:

*Example VII*

A substrate was provided which comprised a base of kraft paper, having a ream weight of 40 pounds, laminated with a .5 mil thick sheet of polyethylene. The unlaminated surface of the polyethylene was modified by electrostatic treatment. 0.9 pound per ream of the primer composition of Example I, diluted with water to a total solids content of 20 percent, was applied by the air knife method to the modified polyethylene surface at a speed of 350 feet per minute. The primed substrate was then dried at 121° C. for 4 seconds. The dried primer coat was .03 mil thick. 10 pounds per ream of polyvinylidene chloride latex containing a total solids of 56 percent was applied with an air knife coater onto the dried primed substrate at a rate of 400 feet per minute. The coated substrate was then dried at 140° C. for 10 seconds. The dried polyvinylidene chloride film measured .4 mil thick.

As used herein, a ream is composed of 500 sheets, each sheet measuring 2 feet by 3 feet or, in the alternative, 300 feet$^2$ ream.

The properties of uncoated high density polyethylene as compared with coated substrates are reflected in the following table. The thickness of the primer composition used in the polyethylene-polyvinylidene chloride films was about .03 mil, dry basis:

| Film | Water vapor transmission rate (g./100 in.$^2$/24 hrs. at 100° F. and 90% RH) | Oxygen transmission rate (cc./mm./cm.$^2$/sec./cm. Hg$\times 10^{-10}$ at 25° C.) |
|---|---|---|
| High density polyethylene, 1 mil thick | 0.81 | 55.0 |
| ½ mil thick polyethylene coated with ½ mil thick polyvinylidene chloride film | 0.34 | 0.22 |
| ¼ mil thick polyethylene coated with ¾ mil thick polyvinylidene chloride film | 0.27 | 0.81 |

It is noted that the coated substrates give appreciable reductions in water vapor and oxygen transmission rates. As the amount of polyvinylidene chloride is increased, there is a corresponding increase in water and gas impermeability. The adhesive properties of the primer composition were such that the components of the coated film were inseparable.

Films produced upon drying the vinylidene chloride polymer latex disposed on primed polyethylene substrates are characterized by a high gloss, toughness, excellent mar resistance, moderate scorability, moderate foldability, some fire-retardant properties, excellent clarity, good blocking resistance, high electrical resistivity and extremely high gas impermeability.

We claim:
1. A composition for priming polyethylene surfaces consisting essentially of (1) a vinylidene chloride polymer latex, said polymer containing at least 70% by weight of vinylidene chloride, (2) a stabilized silica sol, and (3) a modified rosin, the total solids content of the composition being 10 percent to 50 percent by weight and is composed of 10 percent to 65 percent of latex solids, 10 percent to 50 percent of colloidal silica, and 15 percent to 80 percent of modified rosin solids.

2. A composition according to claim 1 wherein the vinylidene chloride latex contains 70 percent to 95 percent by weight vinylidene chloride monomer copolymerized with 5 percent to 30 percent of other monomers copolymerizable therewith.

3. A composition according to claim 1 wherein the stabilized silica sol contains 15 percent to 30 percent $SiO_2$.

4. A composition according to claim 3 wherein the sol contains 30 percent $SiO_2$ chemically combined with 0.2 percent $Al_2O_3$.

5. A composition according to claim 1 wherein the modified rosin is comprised of 40 percent to 45 percent rosin-derived resins dispersed in aqueous alkali hydroxide.

6. A composition for priming polyethylene surfaces consisting essentially of (1) a vinylidene chloride polymer latex, said polymer containing at least 70% by weight of vinylidene chloride, (2) a stabilized silica sol, and (3) a modified rosin, the total solids content of the composition being 37.2 percent to 47.5 percent by weight and is composed of 10 percent to 60 percent of latex solids, 10 percent to 50 percent of colloidal silica, and 19.35 percent to 80 percent of modified rosin solids.

7. A film substantially impervious to water vapors, organic vapors, and gases comprising a polyethylene substrate having a modified surface, a primer composition deposited on said modified surface, and a film of a vinylidene chloride polymer disposed on and bonded to the primer composition, said primer composition being derived from a mixture consisting essentially of (1) a polymer latex, said polymer containing at least 70% by weight of vinylidene chloride, (2) a stabilized silica sol, and (3) a modified rosin, the total solids content of the primer composition being between about 10 percent to 50 percent by weight and is composed of 10 percent to 65 percent of latex solids, 10 percent to 50 percent of colloidal silica, and 15 percent to 80 percent of modified rosin solids.

8. A film according to claim 7 wherein the polymer latex contains 70 percent to 95 percent by weight vinylidene chloride monomer copolymerized with 5 percent to 30 percent of other monomers copolymerizable therewith.

9. A film according to claim 7 wherein the stabilized silica sol contains 15 percent to 30 percent $SiO_2$.

10. A film according to claim 9 wherein the sol contains 30 percent $SiO_2$ chemically combined with 0.2 percent $Al_2O_3$.

11. A film according to claim 7 wherein the modified rosin is composed of 40 percent to 45 percent of rosin derived resins dispersed in aqueous alkali hydroxide.

References Cited by the Examiner

UNITED STATES PATENTS 2,990,391   6/1961   Grantham _____ 260—27 XR

FOREIGN PATENTS 564,033   9/1958   Canada.

WILLIAM D. MARTIN, *Primary Examiner.*

RICHARD D. NEVIUS, *Examiner.*